Feb. 15, 1955  A. FOTI  2,702,323
SIDE OPENING SHUNTLESS DISCONNECT SWITCH
Filed Feb. 16, 1951  11 Sheets-Sheet 2
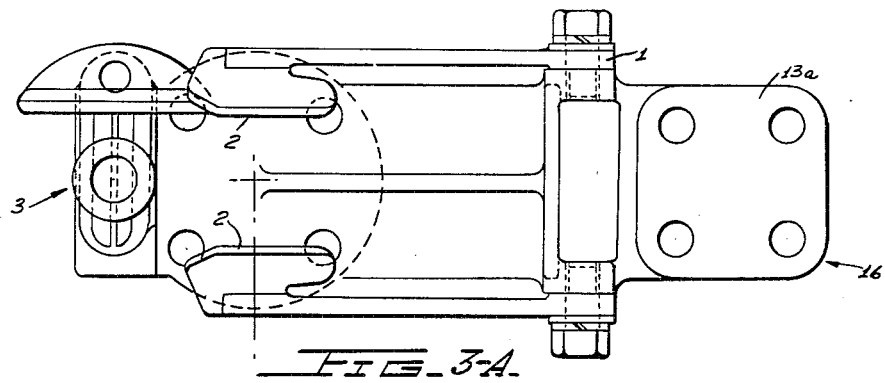
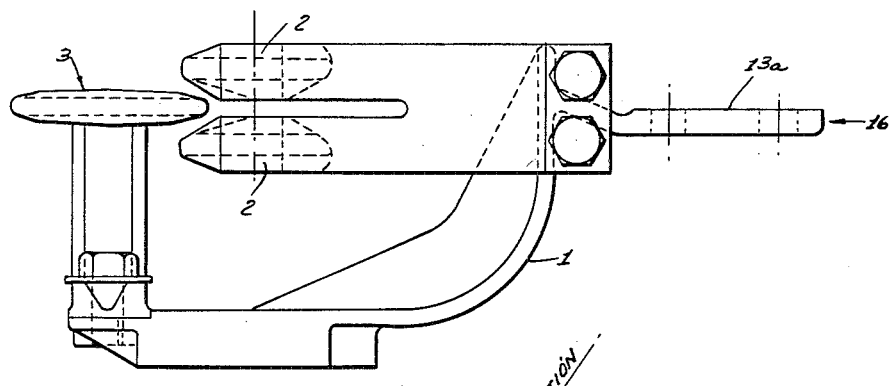
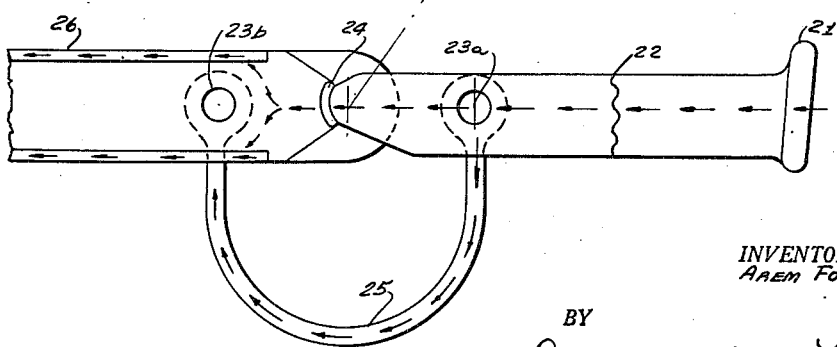
INVENTOR.
AREM FOTI
BY
Ostrolenk & Faber
ATTORNEYS

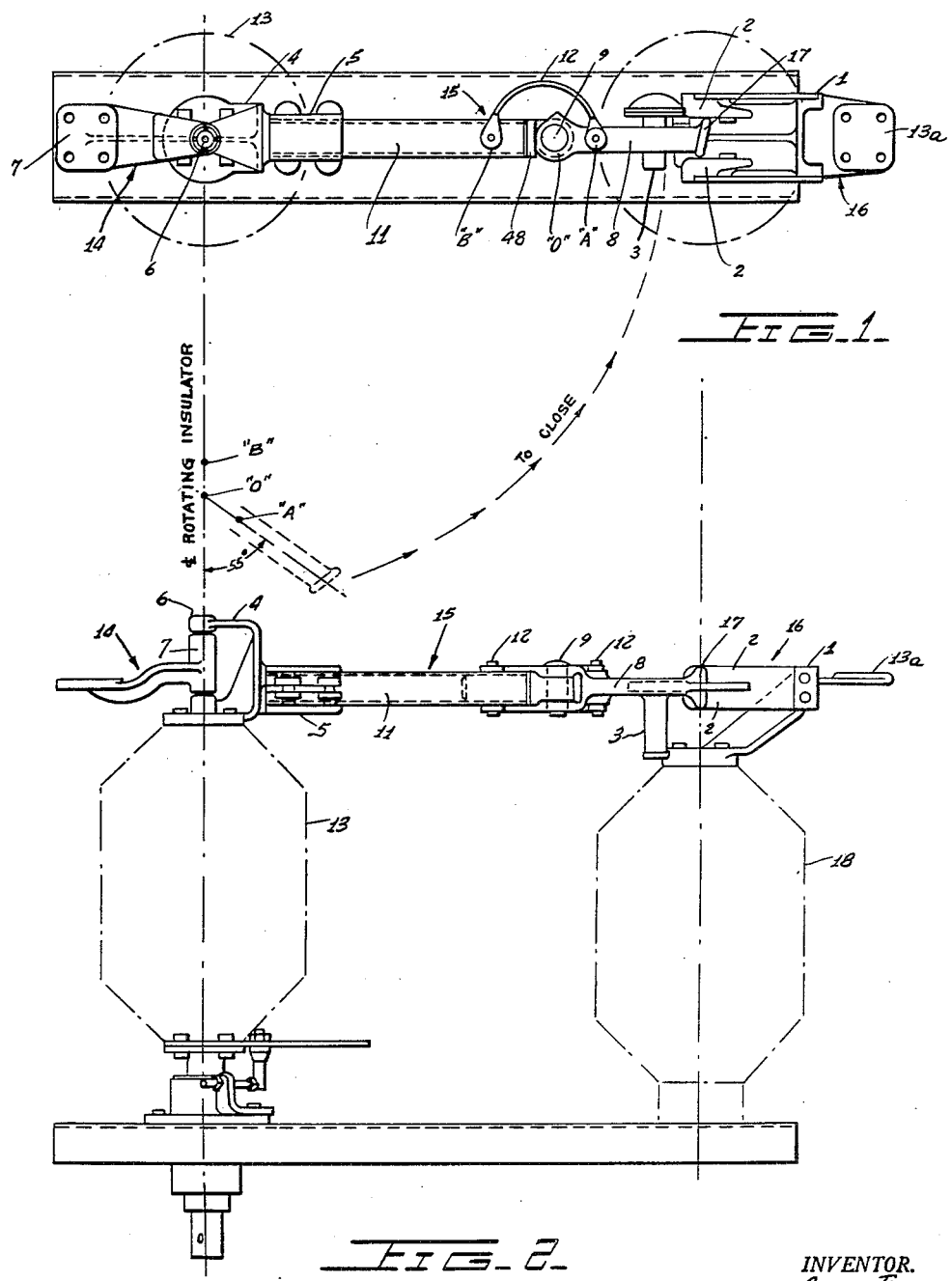

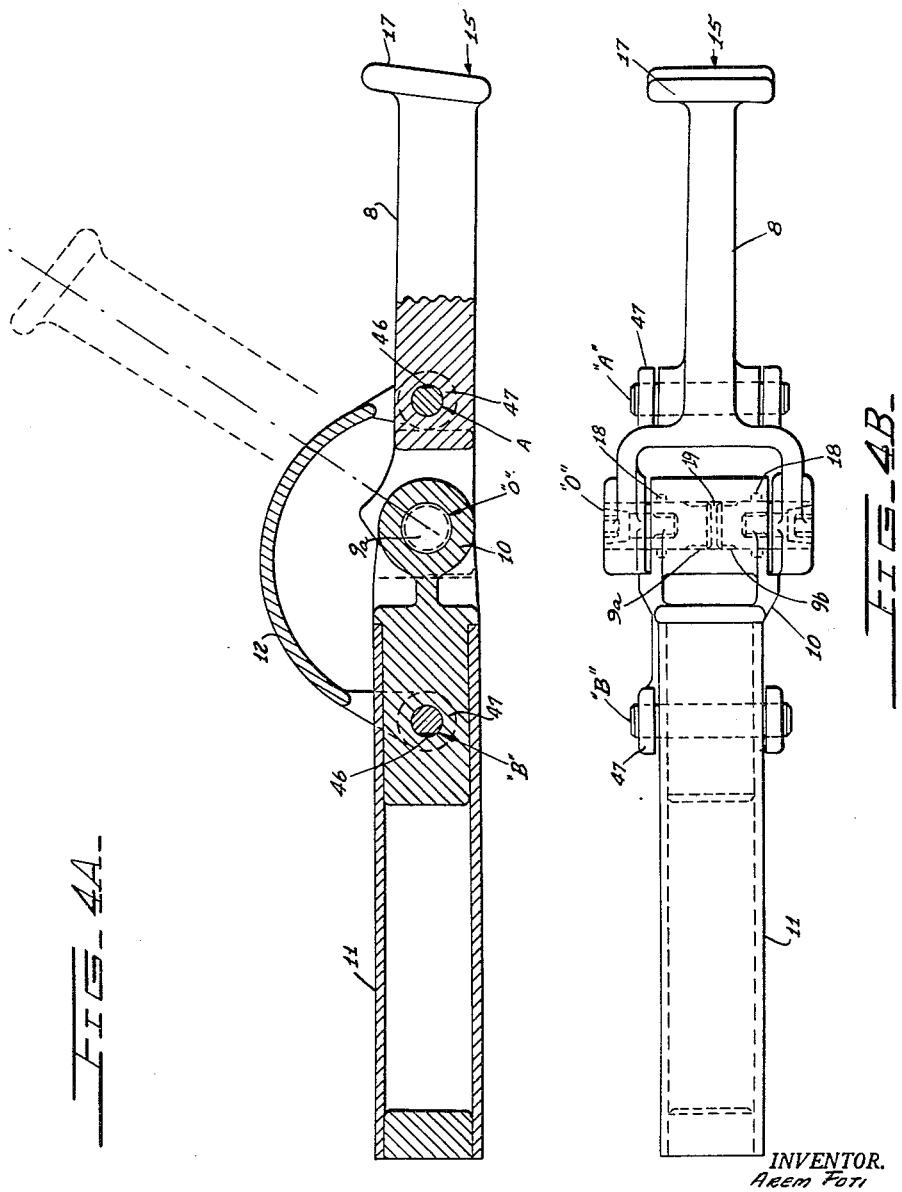

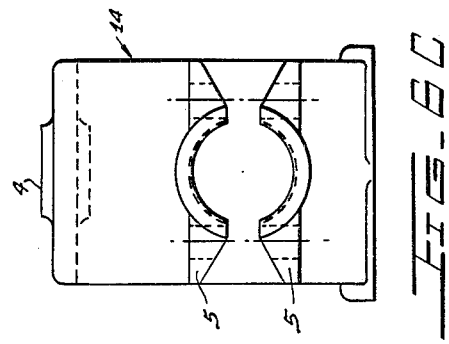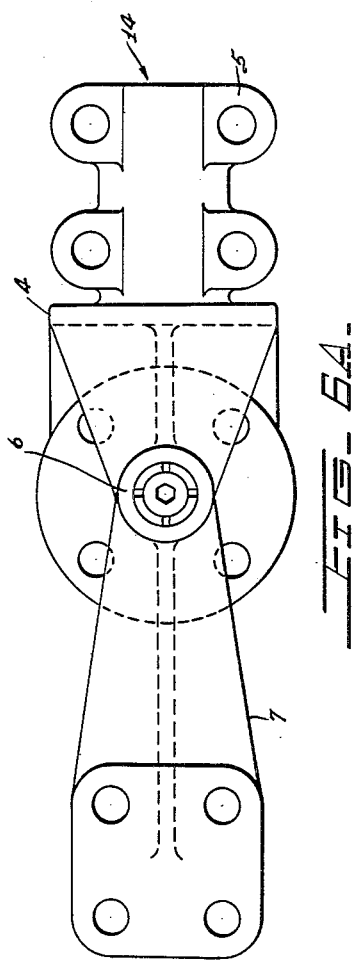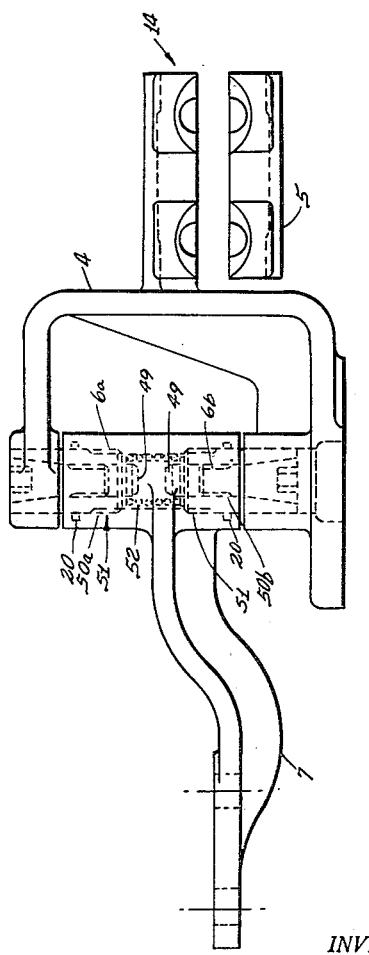

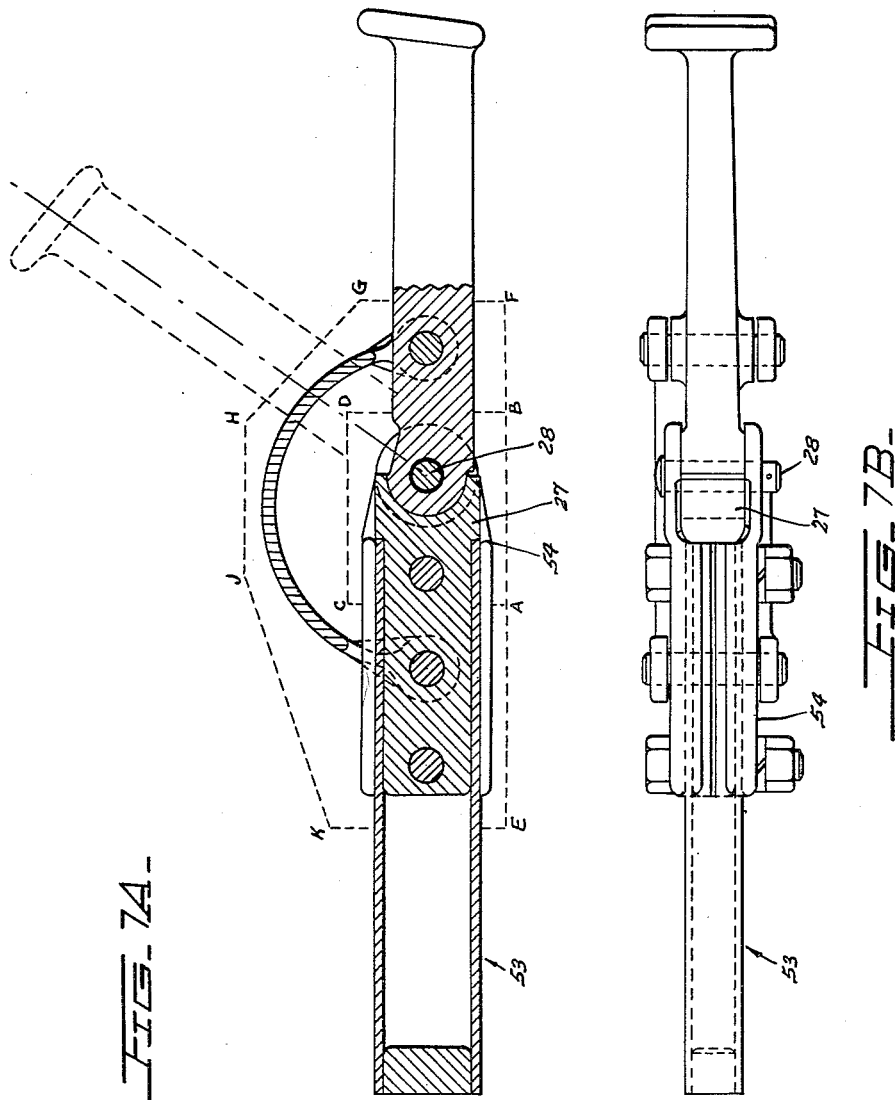

Feb. 15, 1955 A. FOTI 2,702,323
SIDE OPENING SHUNTLESS DISCONNECT SWITCH
Filed Feb. 16, 1951 11 Sheets-Sheet 6
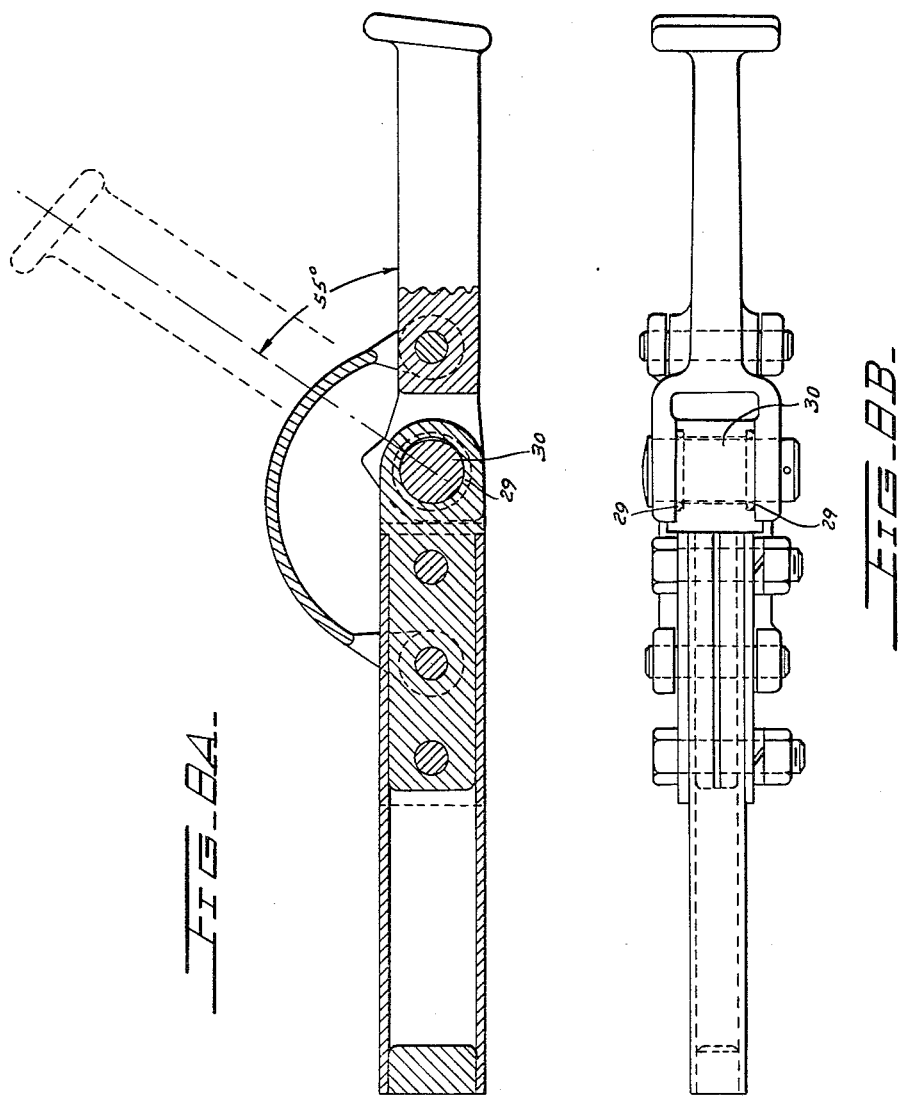
INVENTOR.
AREM FOTI
BY
Ostrolenk & Faber
ATTORNEYS Feb. 15, 1955 A. FOTI 2,702,323
SIDE OPENING SHUNTLESS DISCONNECT SWITCH
Filed Feb. 16, 1951 11 Sheets-Sheet 7
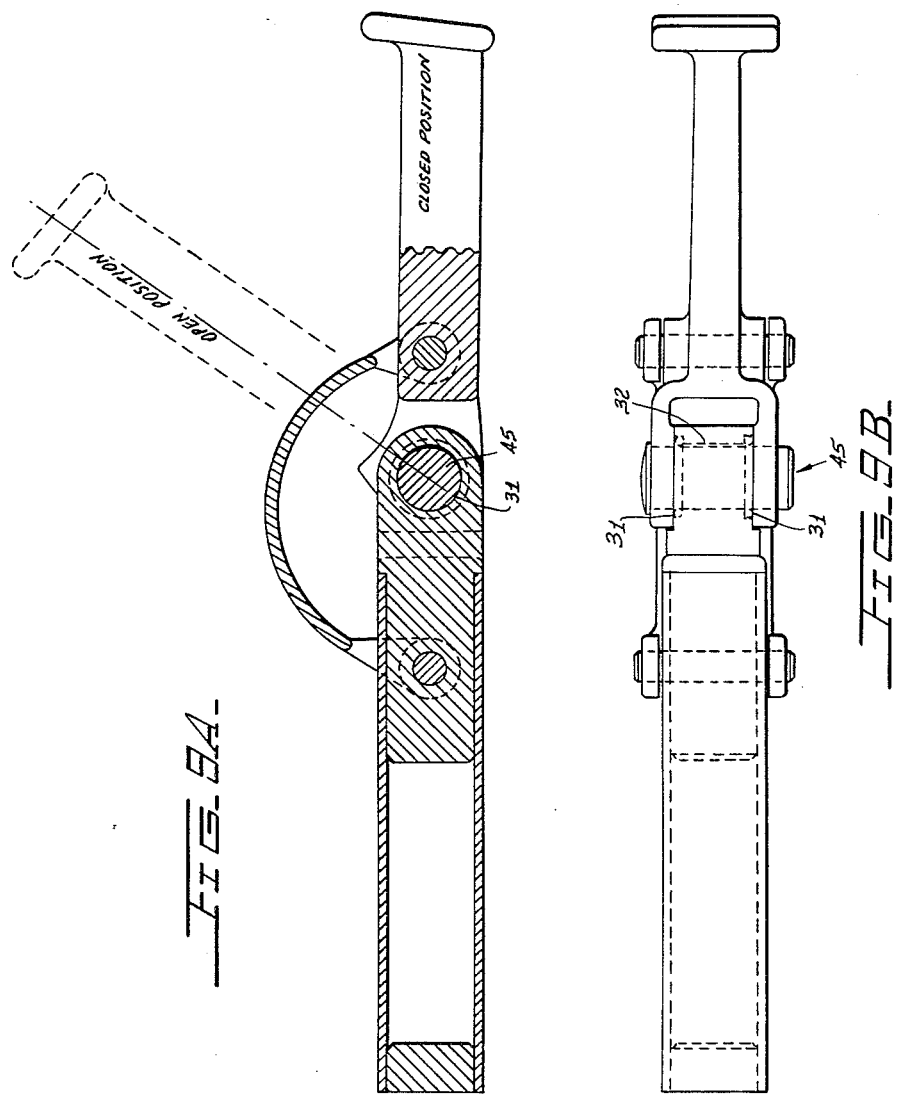
INVENTOR.
AREM FOTI
BY
Ostrolenk & Faber
ATTORNEYS

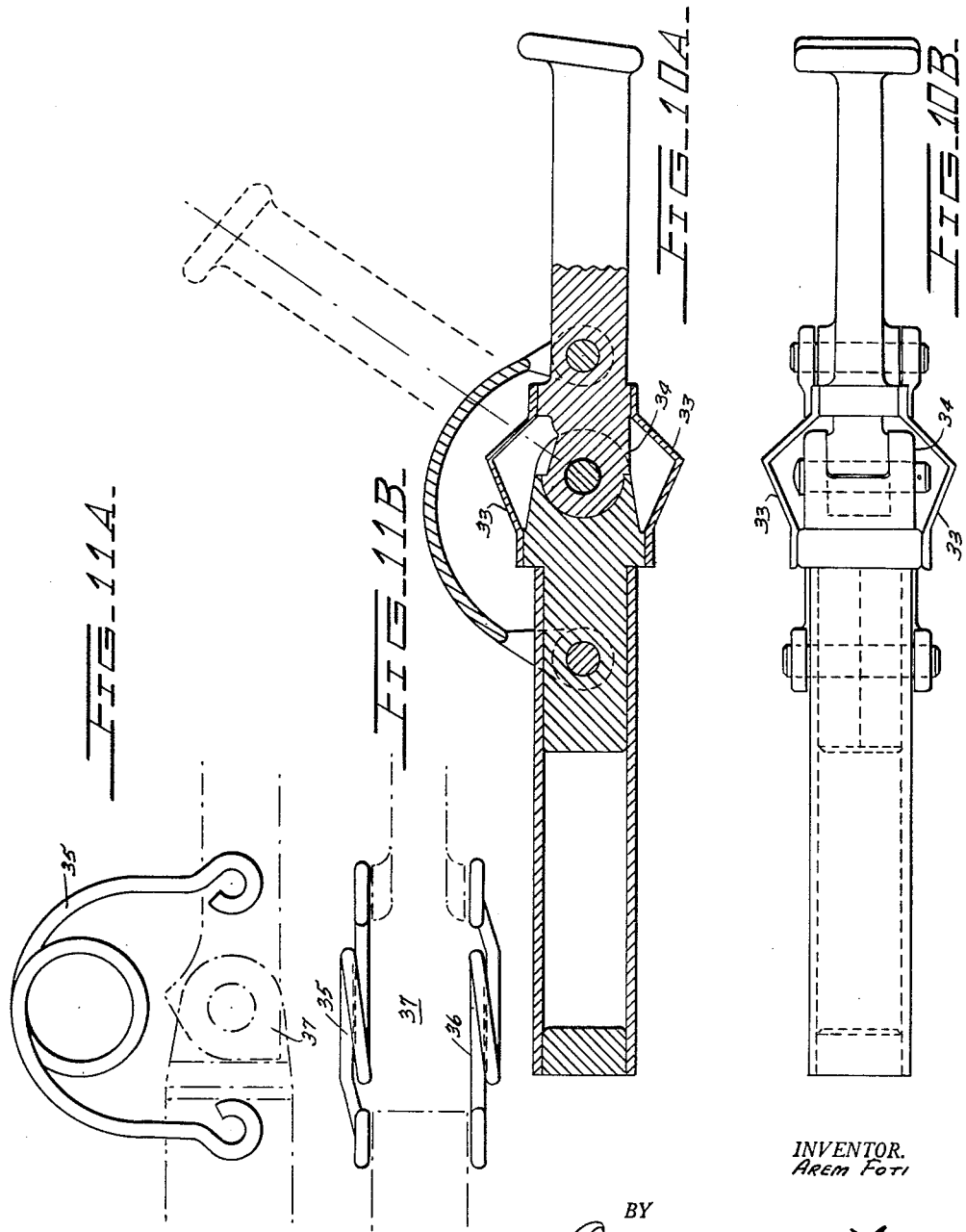

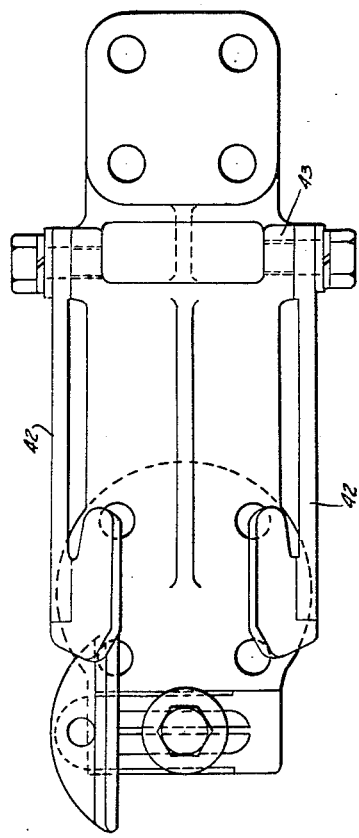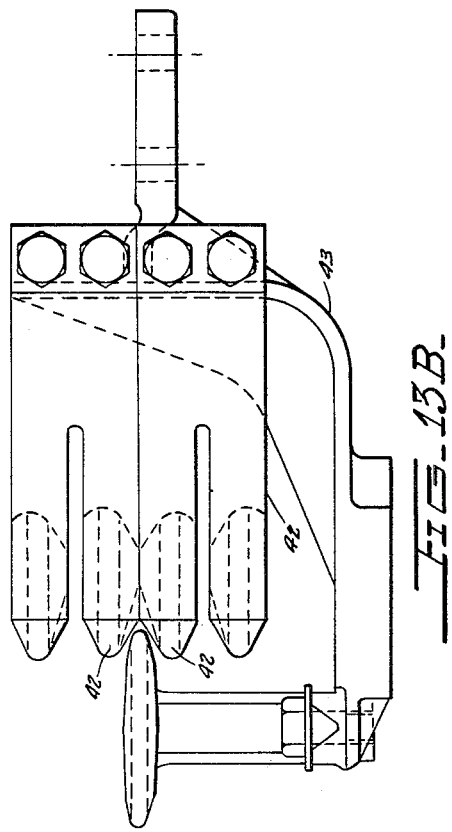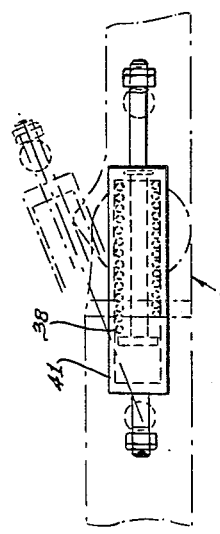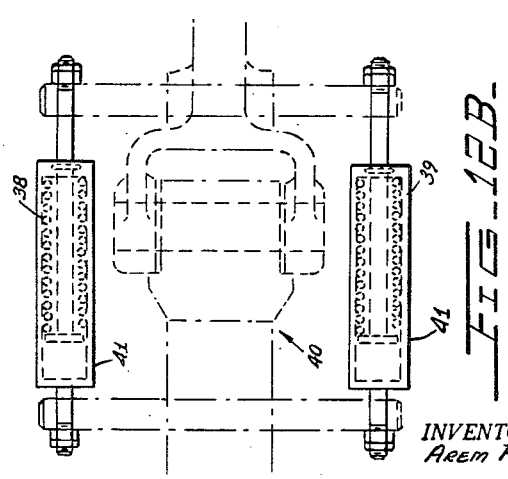

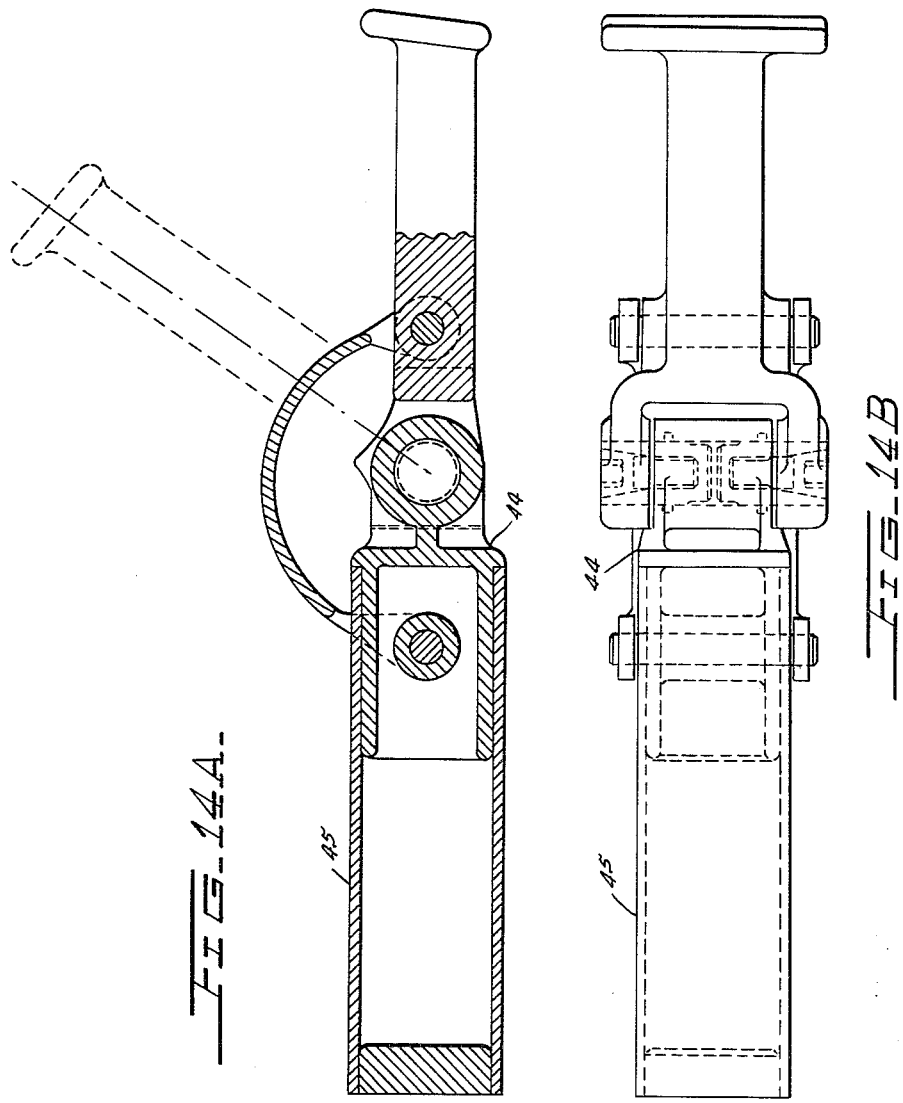

Feb. 15, 1955 A. FOTI 2,702,323
SIDE OPENING SHUNTLESS DISCONNECT SWITCH
Filed Feb. 16, 1951 11 Sheets-Sheet 11
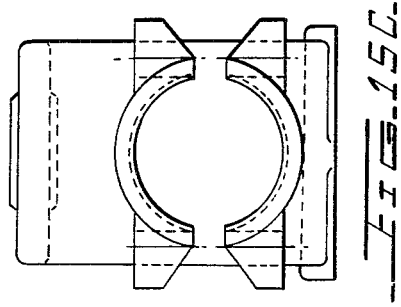
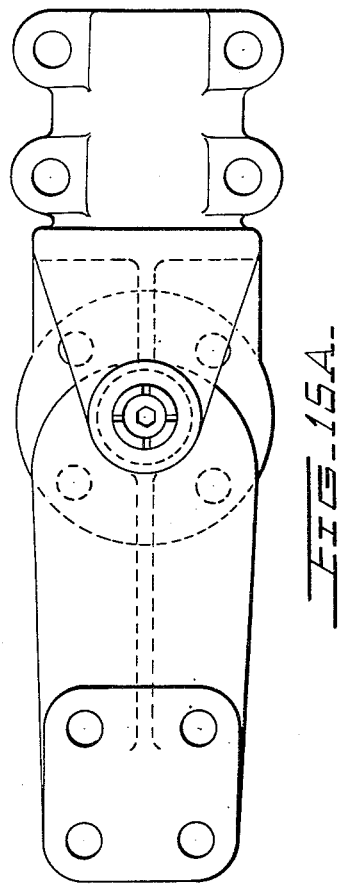
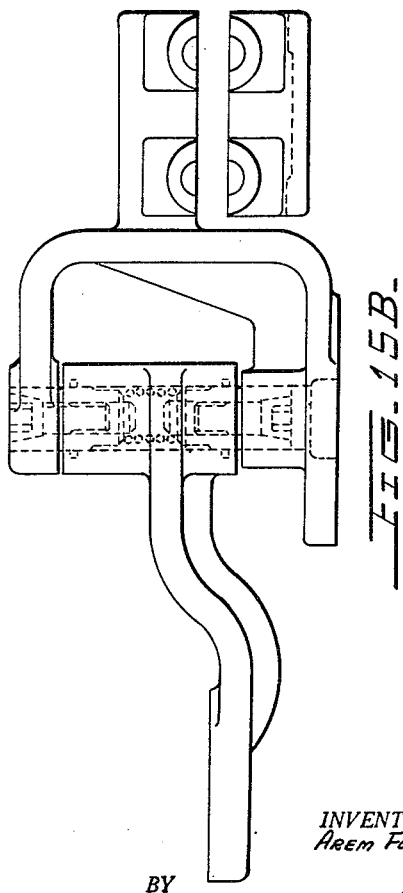
INVENTOR.
AREM FOTI
BY
Ostrolenk & Faber
ATTORNEYS

# United States Patent Office 2,702,323
Patented Feb. 15, 1955

2,702,323

SIDE OPENING SHUNTLESS DISCONNECT SWITCH

Arem Foti, Greensburg, Pa., assignor, by mesne assignments, to I-T-E Circuit Breaker Company, Philadelphia, Pa., a corporation of Pennsylvania Application February 16, 1951, Serial No. 211,374

8 Claims. (Cl. 200—48)

This invention relates to high voltage air switches and more particularly to side opening insulator stack type switches, in which the main current path is free of braided flexible conductors and therefore called "shuntless."

Many disconnect switches have been mounted on three insulators, one to carry the stationary contacts, one the movable contact arm assembly, and one the operating crank or assembly for the movable contact arm. The movable contact arm was arranged so that it might rotate angularly from the position away from its contacting position to a position where it engages the stationary contact. The movable contact arm was also arranged so that after its contact carrying end entered the stationary contact, the movable contact arm was rotated into high pressure engagement.

In most prior constructions, it was thought necessary that a current carrying connection be established from one terminal of the disconnect switch directly to the contact arm, and since two separate motions were necessary to establish contact, it was thought that a flexible connection permitting rotation of the movable contact in two planes was essential to ensure that a good current carrying connection would at all times be made from the terminal to the movable contact arm.

When such flexible connections were properly weatherproofed and otherwise protected, they proved highly efficient, but sometimes because of incomplete weatherproofing or unusual weather or other operating conditions, it happened that these flexible connections tended to crystallize and break, or corrode to failure.

Various attempts to obviate the need for the flexible connection have been substantially limited to constructions wherein the movable contact arm was made as a bridging contact so that the terminal extending to the source of electric current was directly connected to a stationary contact and the terminal to the load was also directly connected to a stationary contact.

Various other attempts have been made to provide for sliding contacts in place of flexible connections at the pivot point of the contact arm. In all of these cases, either the sliding contact was exposed to atmosphere and subjected to weathering or other corroding elements or the angle of movement of the contact element was such that the contact end became cumbersome in use or size, difficult to manufacture, or inefficient in current carrying capacity.

The primary object of the present invention is to provide a toggle type of contact arm, the toggle knee pin or hinge serving as a current carrying contact and the toggle contact arm having a combination toggle and contact spring to supply the pressure required to make and break the toggle as well as the contact pressure required at the toggle hinge electrical contact.

Another object of this invention is to provide more simplified current carrying elements by using the combination toggle and contact spring as a current path to supplement the main current path through the toggle. The spring then serves as a resilient solid metal conductor.

Another object of this invention is to provide the toggle connection with a combination toggle and contact spring which may be mounted and worked equally well either on the inside of the toggle or on the outside.

Another object is to provide a toggle hinge contact which is enclosed and weather-sealed.

A still further object is to provide a weather-sealed high pressure spot contact type blade hinge terminal.

Another object is to make such switches easy to change from clockwise to counterclockwise operation.

A further object of this invention is to make possible the lengthening or shortening of the distance from toggle path to rotating insulator, making possible the adjustment of the contact surface of the toggle head casting in jaw contacts to assure proper adjustment.

These and other objects of the invention will become apparent in the following description in which:

Figure 1 is a plan view of the disconnect switch of this invention, more particularly of a single pole side-opening shuntless type switch for 600 amps.

Figure 2 is a front view of the disconnect switch of Figure 1.

Figure 3a shows a plan view of the jaw assembly of the switch of Figure 1.

Figure 3b is a front view of the jaw assembly of the switch of Figure 1.

Figure 4a shows a plan view of the switch blade assembly of the switch of Figure 1.

Figure 4b is a front view of the switch blade assembly of the switch of Figure 1.

Figure 5 shows a plan view of a modified form of switch blade assembly.

Figure 6a shows a plan view of the blade hinge terminal assembly of the switch of Figure 1.

Figure 6b shows a front view of the blade hinge terminal assembly of the switch of Figure 1.

Figure 6c is a side view of the blade hinge terminal assembly of the switch of Figure 1.

Figure 7a is a plan view of a modified switch blade assembly for a 600 amp switch with rectangular blade tube.

Figure 7b is a front view of a modified switch blade assembly for a 600 amp switch with rectangular blade tube.

Figure 8a is a plan view of a modified switch blade assembly of a 600 amp switch with rectangular blade tube and sealed internal hinge contacts.

Figure 8b is a front view of a modified switch blade assembly of a 600 amp switch with rectangular blade tube and sealed internal hinge contacts.

Figure 9a is a front view of a sealed internal hinge contact of a switch blade assembly with round blade tube.

Figure 9b is a plan view of a sealed internal hinge contact of a switch blade assembly with round blade tube.

Figure 10a is a plan view of a switch blade assembly with round blade tube with the hinge contact weatherproofed by a rubber cover.

Figure 10b is a front view of a switch blade assembly with round blade tube with the hinge contact weatherproofed by a rubber cover.

Figure 11a is a front view of the combined toggle and contact spring using two torsion type springs straddling the toggle hinge joint.

Figure 11b is a plan view of the combined toggle and contact spring using two torsion type springs straddling the toggle hinge joint.

Figure 12a is a plan view of a combined toggle and contact spring using two weather-sealed helical compression springs straddling the toggle hinge joint.

Figure 12b is a front view of a combined toggle and contact spring using two wheather-sealed helical compression springs straddling the toggle hinge joint.

Figure 13a is a front view of the jaw assembly of the disconnect switch of this invention, more particularly of a single pole side opening shuntless type switch for 1200 amps.

Figure 13b is a plan view of the jaw assembly of the disconnect switch of this invention more particularly of a single pole side opening shuntless type switch for 1200 amps.

Figure 14a is a front view of the switch blade assembly of the switch of Figure 1, using threaded toggle hinge contact pins.

Figure 14b is a plan view of the switch blade assembly of the switch of Figure 1, using threaded toggle hinge contact pins.

Figure 15a is a front view of the blade hinge terminal assembly of the switch of Figure 1, more particularly for 1200 amps.

Figure 15b is a plan view of the blade hinge terminal assembly of the switch of Figure 1, more particularly for 1200 amps.

Figure 15c is a side view of the blade hinge terminal assembly of the switch of Figure 1, more particularly for 1200 amps.

Referring first to Figures 1, 2, 3a and 3b, the jaw assembly 16 is composed of three main parts, support casting 1, contact tips 2 and blade stop casting 3. The support casting 1 is secured to the stationary or jaw insulator 18. The two contact tips 2 and the blade stop casting 3 are secured to the support casting 1 in any suitable manner.

Referring then to Figures 1, 2, 4a and 4b, the complete switch blade 15 is made up of the following main parts: toggle head casting 8, hinge contact pins 9a and 9b, blade end plug 10, blade tube 11, and the combined toggle and contact spring 12.

The spring 12 is secured to the blade tube 11 and the toggle head casting 8 by pins B and A with cotter pins at their ends in a manner hereinafter described. The switch blade shown in Figure 4a has a sealed internal toggle hinge contact; one pin 9a could be made right-hand thread and the other 9b left-hand thread to give a turnbuckle effect and create side pressure on the threads when the switch is closed. A rubber ring seal or gasket 18 is provided to seal the internal hinge contacts and space 19 is filled with "No-ox-id" or other suitable erosion-excluding or inhibiting material.

When the switch is closed as in Figure 1, the current flows from the terminal of jaw assembly 13a to the jaw contact tips 2, from the jaw contact tips 2 to the contact 17 of the toggle head 8 of the blade assembly 15, then along the toggle head of the blade 8, through pressure loaded toggle hinge contacts 9a and 9b, blade end plug 10, and into the blade tube 11 along blade tube 11 and into blade hinge casting 4 (Figures 6a and 6b). The blade end plug 10 is a knurled press fit into blade tube 11. The combined toggle and contact spring 12 is preferably made of beryllium copper, a high conductivity resilient metal, and would thus be a high electrical conductivity spring member.

Assuming the pins B and A at the end connection of this spring member 12 to be of relatively high conductivity metal, then with high pressure spot contacts 46 at the points where the spring ends 47 bear against the end connection pin A or B and with this end connection pin a press fit into the toggle head casting 8 and blade end plug 10, respectively, the combined toggle and contact spring 12 supplements the main toggle hinge contact 9 and serves as a parallel path through which the current can pass from the toggle head casting 8 to the blade end plug 10.

This can be seen more clearly in Figure 5, a variation of this switch. In this figure, the main current goes from the toggle head contact 21 through the toggle head 22, the main toggle hinge contact 24 into the blade tube 26. The auxiliary path of current is from the high conductivity pin 23a, through the high conductivity combination toggle and contact spring 25, here shown mounted on outside of toggle, to the high conductivity pin 23b. The two pins 23a and 23b form a high pressure spot contact with the toggle head casting 22 and the blade tube 26.

Referring finally to Figures 1, 2, 6a and 6b and 6c, the blade hinge terminal assembly 14 is made up of essentially four parts, blade hinge casting 4, blade clamp casting 5, pressure loaded hinge contact pin 6 and terminal casting 7. When the switch is closed, the current flows from the blade tube 11 into the blade hinge casting 4, to the sealed pressure hinge contact pins 6, into the hinge terminal casting 7 and out the terminal pad of this casting 7.

As in the case of the toggle hinge contact, one blade hinge terminal contact pin 6a could be made right-hand thread and the other 6b left-hand thread to create a turnbuckle effect. Or both pins 6a and 6b could be made right-hand threads and a compression spring 52 placed between the pins 6a and 6b bearing against the ends 49 of said pins 6a and 6b producing a longitudinal pressure on the pins so that the threads 50a and 50b of the pins 6a and 6b are in close current carrying engagement on one side in the threads 51 of the terminal casting 7. The hinge contacts are sealed by rubber ring seals 20.

Referring to the single pole switch of Figure 1, the operation of the switch from closed to open position is as follows:

Initial rotation of the rotating insulator 13 would collapse the toggle. The toggle is collapsed through the physical displacement of point A with respect to points B and O under the influence of the pressure supplied by the combined toggle and contact spring 12.

When the toggle has been collapsed to the 55° position, or when the point A has been displaced 55° from the line BO with point O taken as the pivot, the contact line of the toggle head 8 has moved longitudinally in a direction toward the rotating insulator 13. At this 55° toggle position, the toggle head 8 will clear the jaw contact tips 2 and will permit the entire blade assembly 15 to be moved in the arc of opening. Pressure on toggle hinge contact pins 9a and 9b will be at its minimum value in this position.

Additional rotation of the rotating insulator 13 will swing the blade 15 away from the jaw 16 to any desired "blade open" position, giving a definite visible break between the switch blade 15 and the switch jaw 16.

During the entire opening cycle as outlined above, it is to be noted that the hinge contacts 6a and 6b at the blade hinge terminal 14 are in constant engagement. The current path is not broken at any time at the hinge terminal 14. Torque in the form of a rigid conductor connection at the hinge terminal 14 prevents rotation of hinge terminal 7 during the movement of the blade 15 in the arc of opening or closing the switch.

Upon closing the switch from the full open position, the following sequence is encountered:

Effort applied to rotating insulator 13 moves the blade 15 in the arc of closing. This blade movement is undisturbed until the toggle head casting 8 strikes the blade stop casting 3 of the jaw assembly 16. The combination toggle and contact spring 12 holds the toggle head casting 8 in the collapsed or 55° position. Therefore, when the toggle head casting 8 strikes the blade stop casting 3, it is at 55° from the center line of the blade.

Since the blade stop 3 prevents further rotational movement of the toggle head 8, additional effort applied at the rotating insulator 13 tends to close the toggle; in other words, tends to bring points A, B and O of the toggle into alignment. While this takes place, the contact surface of the toggle head 8 moves longitudinally and in a direction toward the contact tips 2 of the jaw assembly 16. Also, the combination toggle spring 12 is subjected to increasingly greater deflection which in turn increases the lateral loading on the toggle hinge contact pins 9a and 9b. Thus, the contact pressure imparted to the toggle hinge contact pins 9a and 9b is maximum when the switch is closed.

Sufficient movement of the rotating insulator 13 will "stretch out" the toggle a desired amount until the contact surfaces 17 of the toggle head 8 seat properly in the jaw contact tips 2. With the toggle in this position, a stop surface on the toggle head casting 8 engages a stop ledge 48 on the blade end plug 10 thus limiting rotation of the toggle head 8 with respect to blade tube 11. At this point, the switch blade 15 is in the fully closed position and the current path is as outlined above.

By proper choice and arrangement of stop surface on toggle head 8 and stop ledge 48 of the blade end plug 10, the toggle action may be stopped geometrically at any one of three positions when the switch is closed. These positions are:

1. Before point A reaches line OB extended;
2. Just as point A reaches line OB so that points A and B and O are all on the same line; or
3. When point A has passed line OB extended.

Under position (1) above, the combination toggle-contact spring 12 would tend to collapse the toggle toward the "open" position.

Position (2) above, with the three toggle points in line would find no tendency of the spring 12 to affect or change the relationship of the three toggle points.

Under position (3) above, the toggle spring 12 would tend to collapse the toggle; but in this case, in a direction away from the "open" toggle position.

As mentioned above, the final portion of the switch closing operation accomplishes a "stretching out" of the toggle. The combination toggle-contact spring 12 pressure would increase as the toggle is "stretched out" farther and farther and would become maximum when the switch is fully closed. This is a very desirable feature in that the contact pressure for the toggle hinge contact pins 9 is maximum with switch closed and becomes minimum when the switch is opened. Very desirable too is the fact that this increased contact pressure is acquired without increasing the operating effort required at the rotating insulator 13. Because, as the toggle spring 12 pressure becomes greater when the toggle is "stretched out," the torque on the toggle head 8 decreases because of the rapid decrease of the effective toggle torque arm which is measured as the perpendicular distance from point O to the line connecting points A and B. Final contact pressure on the toggle hinge contact pins 9 may be made to suit by a properly designed toggle-contact spring 12.

Arcing horns may be used with the side break switch of Figure 1. The stationary horn would be clamped in place on the blade stop casting 3 and the movable arcing horn would be suitably clamped to the blade tube 11. The switch shown in Figure 1 is for clockwise rotation of rotating insulator 13. By turning the blade 180° in the blade hinge casting 4 and by reversing the blade stop casting 3, the switch may be set up for counterclockwise rotation of rotating insulator 13. When the rectangular blade tube is used as in Figure 7, the blade end plug 27 is secured in a suitable way to the rectangular blade tube 53. Instead of two contact pins as in Figure 1, only one pin 28 is used. Pin 28 is used here purely as a means of mechanically retaining the toggle head to the blade end plug 27. The electrical contact surface is the semi-cylindrical, pressure loaded surface at the junction of the toggle head and blade end plug 27. A flexible rubber shield for contact hinge may be designed to cover the space shown in Figure 7 as either A, B, C, D, or E, F, G, H, J, K.

Using a rectangular blade tube, a sealed internal hinge contact is obtained as shown in Figure 8 where two rubber ring seals 29 seal the internal hinge contact while the inside space 30 is filled with No-ox-id or other corrosion resisting material.

Similarly, if a round blade tube is used, a sealed internal hinge contact is obtained as in Figure 9 by putting two rubber ring seals 31 on the hinge contact pin 45 and by filling the internal space 32 with No-ox-id.

If a round blade tube is used and the hinge is to be protected, an arrangement similar to that of Figure 10 could be used. In Figure 10, a rubber shield or cover 33 is secured in a suitable way around the contact hinge 34. A modification of the combined toggle and contact spring is shown in Figure 11 where 35 is the upper torsion type spring and 36 is the lower torsion type spring. Both springs straddle the toggle hinge joint 37. When the switch is closed, the two springs are in tension.

Another modification of the combined toggle and contact spring is shown in Figure 12 where an upper 38 and lower 39 helical compression spring secured on one side to the toggle head and on the other to the blade tube straddle the toggle hinge joint 40. Here too, the two helical compression spring assemblies are in tension when the switch is closed. The springs 38 and 39 are enclosed in a housing 41 and sealed from weather.

In the 1200 amp switch, the jaw assembly in Figure 13 is of larger dimensions than that of the 600 amp. switch because of the larger current flow. More particularly, there are two sets of contact tips 42 secured in a suitable manner to the support casting 43.

The same larger dimensions can be found in the switch blade assembly of the 1200 amp. switch as shown in Figure 14. The blade end plug 44 has a different shape from that of the 600 amp. switch but it is also a knurled press fit in the round blade tube 45. Finally, the terminal hinge assembly of the 1200 amp. switch as shown in Figure 15 also has larger dimensions than the 600 amp. switch shown in Figure 1.

In the foregoing, I have described my invention in connection with preferred illustrative embodiments thereof. Since many variations and modifications of my invention will now be obvious to those skilled in the art, I prefer to be bound not by the specific disclosure herein contained, but only by the appended claims.

I claim:

1. A disconnect switch having a movable contact arm and a complementary contact; said movable contact arm comprising a toggle having a pair of links connected at a hinge; a terminal; the free end of one of said links being connected to said terminal, the free end of the other link having a contact engageable with said complementary contact; said hinge including a current carrying contact for conducting current from one of said links to the other of said links, and a toggle spring connected between said links and biasing said links toward toggle relation; a pin in each link connected to said spring and comprising the means of connection between a current carrying contact surface between each pin and its link.

2. A disconnect switch having a movable contact arm and a complementary contact; said movable contact arm comprising a toggle having a pair of links connected at a hinge; a terminal; the free end of one of said links being connected to said terminal, the free end of the other link having a contact engageable with said complementary contact; said hinge including a current carrying contact for conducting current from one of said links to the other of said links, and a toggle spring connected between said links and biasing said links toward toggle relation; a pin in each link connected to said spring and comprising the means of connection between a current carrying contact surface between each pin and its link, said spring creating current carrying contact at each of said contact surfaces.

3. A disconnect switch having a movable contact arm and a complementary contact; said movable contact arm comprising a toggle having a pair of links connected at a hinge; a terminal; the free end of one of said links being connected to said terminal, the free end of the other link having a contact engageable with said complementary contact and a toggle spring connected between said links and biasing said links toward toggle relation; a pin in each link connected to said spring and comprising the means of connection between each link and said spring; a current carrying contact surface between each pin and its link.

4. A disconnect switch having a movable contact arm and a complementary contact; said movable contact arm comprising a toggle having a pair of links connected at a hinge; a terminal; the free end of one of said links being connected to said terminal, the free end of the other link having a contact engageable with said complementary contact and a toggle spring connected between said links and biasing said links toward toggle relation; a pin in each link connected to said spring and comprising the means of connection between each link and said spring; a current carrying contact surface between each link and said spring; a current carrying contact surface between each pin and its link, said spring creating a current carrying contact at each of said contact surfaces.

5. A disconnect switch having a movable contact arm and a complementary contact; said movable contact arm comprising a toggle having a pair of links connected at a hinge; a terminal; the free end of one of said links being connected to said terminal, the free end of the other link having a contact engageable with said complementary contact; a current carrying contact at said hinge for conducting current from one of said links to the other of said links, and a toggle spring connected between said links and biasing said links toward toggle relation; a pin in each link connected to said spring and comprising the means of connection between a current carrying contact surface between each pin and its link, said spring creating current carrying contact at each of said contact surfaces, said spring forming the current carrying path across the hinge of said toggle.

6. In a current conducting member for a disconnect switch, a toggle having a pair of links connected at a hinge; a current carrying contact at said hinge for conducting current from one of said links to the other of said links and a toggle spring connected between said links and biasing said links toward toggle relation; a pin in each link connected to said spring and comprising the means of connection between each link and said spring, a current carrying contact surface between each pin and its link; said spring creating current carrying contact at each of said contact surfaces.

7. In a current conducting member for a disconnect switch, a toggle having a pair of links connected at a hinge; a toggle spring connected between said links and biasing said links toward toggle relation; a pin in each link connected to said spring and comprising the means of connection between each link and said spring, a current carrying contact surface between each pin and its link, said spring creating current carrying contacts at each of said contact surfaces.

8. In a current conducting member for a disconnect switch, a toggle having a pair of links connected at a hinge; a toggle spring connected between said links and biasing said links toward toggle relation; a pin in each link connected to said spring and comprising the means of connection between each link and said spring, a current carrying contact surface between each pin and its link, said spring creating current carrying contacts at each of said contact surfaces; said spring forming the current carrying path across the hinge of said toggle.

References Cited in the file of this patent

UNITED STATES PATENTS

| | | |
|---|---|---|
| 1,078,523 | Sutherland | Nov. 11, 1913 |
| 1,850,703 | Angold | Mar. 22, 1932 |
| 1,918,542 | Heinrich | July 18, 1933 |
| 1,949,018 | Koppitz | Feb. 27, 1934 |
| 2,227,925 | Cornell et al. | Jan. 7, 1941 |
| 2,269,992 | Scheuermeyer | Jan. 13, 1942 |